United States Patent
Bennett et al.

(10) Patent No.: US 7,793,286 B2
(45) Date of Patent: Sep. 7, 2010

(54) METHODS AND SYSTEMS TO MANAGE MACHINE STATE IN VIRTUAL MACHINE OPERATIONS

(75) Inventors: Steven M. Bennett, Hillsboro, OR (US); Gilbert Neiger, Portland, OR (US); Erik C. Cota-Robles, Portland, OR (US); Stalinselvaraj Jeyasingh, Portland, OR (US); Alain Kagi, Portland, OR (US); Michael A. Kozuch, Export, PA (US); Richard A. Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1013 days.

(21) Appl. No.: 10/324,591

(22) Filed: Dec. 19, 2002

(65) Prior Publication Data

US 2004/0123288 A1    Jun. 24, 2004

(51) Int. Cl.
*G06F 9/46* (2006.01)
*G06F 9/455* (2006.01)
(52) U.S. Cl. .......................................... 718/1; 718/108
(58) Field of Classification Search .................... 718/1, 718/108; 364/200; 709/224
See application file for complete search history.

(56) References Cited

U.S. PATENT DOCUMENTS

| | | | | |
|---|---|---|---|---|
| 4,347,565 A | | 8/1982 | Kaneda et al. ............... 364/200 |
| 4,571,672 A | | 2/1986 | Hatada et al. ............... 364/200 |
| 4,814,975 A | * | 3/1989 | Hirosawa et al. ............... 718/1 |
| 5,016,161 A | * | 5/1991 | Van Loo et al. ............. 718/108 |
| 5,255,379 A | | 10/1993 | Melo ......................... 711/202 |
| 5,319,760 A | | 6/1994 | Mason et al. ................ 711/208 |
| 5,386,552 A | | 1/1995 | Garney ......................... 714/10 |
| 5,437,033 A | * | 7/1995 | Inoue et al. .................... 714/10 |
| 5,511,217 A | * | 4/1996 | Nakajima et al. ........... 718/100 |
| 5,522,075 A | | 5/1996 | Robinson et al. ............ 709/100 |
| 5,553,291 A | * | 9/1996 | Tanaka et al. ................... 718/1 |
| 5,717,903 A | | 2/1998 | Bonola ......................... 703/24 |
| 5,729,760 A | | 3/1998 | Poisner .......................... 710/3 |
| 5,737,604 A | | 4/1998 | Miller et al. .................... 713/1 |

(Continued)

FOREIGN PATENT DOCUMENTS

EP    0600112    6/1994

(Continued)

OTHER PUBLICATIONS

European Patent Office, International Search Report for International Application No. PCT/US03/38728, 6 pages, Jun. 17, 2005.

(Continued)

*Primary Examiner*—Meng-Ai An
*Assistant Examiner*—Eric C Wai
(74) *Attorney, Agent, or Firm*—Thomas R. Lane (57) ABSTRACT

Methods and systems are provided to control transitions between a virtual machine (VM) and Virtual Machine Monitor (VMM). A processor uses state action indicators to load and/or store associated elements of machine state before completing the transition. The state action indicators may be stored in a Virtual Machine Control Structure (VMCS), predetermined, and/or calculated dynamically. In some embodiments, the values loaded can be directly acquired from the VMCS, predetermined and/or calculated dynamically. In some embodiments, the values stored may be acquired directly from machine state, predetermined and/or calculated dynamically.

20 Claims, 6 Drawing Sheets

U.S. PATENT DOCUMENTS

| | | | | |
|---|---|---|---|---|
| 5,854,913 | A | 12/1998 | Goetz et al. | 712/210 |
| 5,890,189 | A | 3/1999 | Nozue et al. | 711/100 |
| 6,075,938 | A * | 6/2000 | Bugnion et al. | 703/27 |
| 6,125,430 | A | 9/2000 | Noel et al. | 711/152 |
| 6,397,242 | B1 * | 5/2002 | Devine et al. | 718/1 |
| 6,496,847 | B1 * | 12/2002 | Bugnion et al. | 718/1 |
| 6,795,966 | B1 * | 9/2004 | Lim et al. | 718/1 |
| 6,944,699 | B1 * | 9/2005 | Bugnion et al. | 710/269 |
| 7,496,656 | B2 * | 2/2009 | Haydock | 709/224 |

FOREIGN PATENT DOCUMENTS

| | | |
|---|---|---|
| EP | 1030237 | 8/2000 |
| WO | WO-01/75564 | 10/2001 |
| WO | WO-01/75565 | 10/2001 |
| WO | WO-01/75595 | 10/2001 |

OTHER PUBLICATIONS

Hall, Judith S. et al., "Virtualizing the VAX Architecture," Computer Architecture News, vol. 19, No. 3, pp. 380-389, May 1, 1991.

Anonymous, "Register Mask Based Microprocessor Context Switching," research disclosure, Kenneth Mason Publications, Westbourne, Great Britain, vol. 318, No. 40, 2 pages, Oct. 1990.

"Intel 386 DX Microprocessor 32-Bit CHMOS Microprocessor with Integrated Memory Management", Intel Corporation, (Dec. 31, 1995), 32-56; figs. 4-14.

"Trusted Computing Platform Alliance (TCPA)", *Main Specification Version 1.1a*, Compaq Computer Corporation, Hewlett-Packard Company, IBM Corporation, Intel Corporation, Microsoft Corporation, (Dec. 2001), 1-321.

Chien, Andrew A., et al., "Safe and Protected Execution for the Morph/AMRM Reconfigurable Processor", *7th Annual IEEE Symposium, FCCM '99 Proceedings*, XP010359180, ISBN: 0-7695-0375-6, Los Alamitos, CA, (Apr. 21, 1999), 209-221.

Cramer, K D., "Information Display Technique for a Terminate Stay Resident Program", *IBM Technical Disclosure Bulletin*, 34(7A), (Dec. 1, 1991),156-158.

Goldberg, R., "Survey of Virtual Machine Research", *IEEE Computer Magazine* 7(6), (1974), 34-35.

Gong, L., et al., "Going Beyond the Sandbox: An Overview of the New Security Architecture in the Java Development Kit 1.2", *Proceedings of the USENIX Symposium on the Internet Technologies and Systems*, Monterey, CA, (Dec. 1997), 103-112.

Gum, P. H., "System/370 Extended Architecture: Facilities for Virtual Machines", *IBM J. Research Development*, 27(6), (Nov. 1983), 530-544.

Heinrich, J., "MIPS R4000 Microprocessor User's Manual" *MIPS Technology, Inc.*, Mountain View, CA; XP00218449,(Apr. 1, 1993),61-97.

Heinrich, J., "MIPS R4000 Microprocessor User's Manual", *MIPS Technology, Inc.*, Mountain View, CA, (1994), pp. 67-79.

Karger, Paul A., et al., "A VMM Security Kernel for the VAX Architecture", *Proceedings of the Symposium on Research in Security and Privacy*, Boxborough, MA, XP010020182, ISBN: 0-8186-2060-9, (May 7, 1990), 2-19.

Kashiwagi, Kazuhiko , et al., "Design and Implementation of Dynamically Reconstructing System Software", *3rd Asia-Pacific Software Engineering Conference (APSEC '96)*, Dec. 4-7, 1996, Seoul, South Korea, (Dec. 1996), 278-287.

Lawton, K. , "Running Multiple Operating Systems Concurrently on an IA32 PC Using Virtualization Techniques", http://www.plex86.org/research/paper.txt, (Aug. 9, 2001), 1-31.

Robin, John S., et al., "Analysis of the Pentium's Ability to Support a Secure Virtual Machine Monitor", *Proceedings fo the 9th Usenix Security Symposium*, XP0022437347, Denver, CO, (Aug. 14, 2000), 1-17.

Rosenblum, M., "Vmware's Virtual Platform: A Virtual Machine Monitor for Commodity PCs", *Proceedings of the 11th Hotchips Conference*, (Aug. 1999), 185-196.

Sherwood, Timothy, et al., "Patchable Instruction ROM Architecture", *International Conference on Compilers, Architecture, and Synthesis for Embedded Systems (CASES)*, Nov. 16-17, 2001, 24-33.

\* cited by examiner

METHODS AND SYSTEMS TO MANAGE MACHINE STATE IN VIRTUAL MACHINE OPERATIONS

TECHNICAL FIELD

Embodiments of the present invention relate generally to computer systems and more specifically to the operational management and/or control of virtual machine operations within computer systems.

BACKGROUND INFORMATION

A virtual machine system permits a physical machine to be partitioned, such that the underlying hardware of the machine appears as one or more independently operating virtual machines (VMs). A Virtual Machine Monitor (VMM) runs on a computer and presents to other software an abstraction of one or more VMs. Each VM may function as a self-contained platform, running its own operating system (OS) and/or application software. Software executing within a VM is collectively referred to as guest software.

The guest software expects to operate as if it were running on a dedicated computer rather than a VM. That is, the guest software expects to control various events and to have access to hardware resources on the computer (e.g., physical machine). The hardware resources of the physical machine may include one or more processors, resources resident on the processor(s) (e.g., control registers, caches, and others), memory (and structures residing in memory, e.g., descriptor tables), and other resources (e.g., input-output devices) that reside in the physical machine. The events may include interrupts, exceptions, platform events (e.g., initialization (INIT) or system management interrupts (SMIs)), and the like.

The VMM may swap guest software state in and out of the processor(s), devices, memory and the registers of the physical machine as needed. The processor(s) may swap some state in and out during transitions between a VM and the VMM. The VMM may enhance performance of a VM by permitting direct access to the underlying physical machine in some situations. This may be especially appropriate when an operation is being performed in non-privileged mode in the guest software, which limits access to the physical machine or when operations will not make use of hardware resources in the physical machine to which the VMM wishes to retain control. The VMM is considered the host of the VMs.

The VMM regains control whenever a guest operation may affect the correct execution of the VMM or any of the non-executing VMs. Usually, the VMM examines such operations, determining if a problem exists before permitting the operation to proceed to the underlying physical machine or emulating the operation on behalf of a guest. For example, the VMM may need to regain control when the guest accesses I/O devices, when it attempts to change machine configuration (e.g., by changing control register values), when it attempts to access certain regions of memory, and the like.

Existing physical machines that support VM operation control the execution environment of a VM using a structure herein referred to as a Virtual Machine Control Structure (VMCS). The VMCS is stored in a region of memory and contains, for example, state of the guest, state of the VMM, and control information indicating under which conditions the VMM wishes to regain control during guest execution. The one or more processors in the physical machine read information from the VMCS to determine the execution environment of the VM and VMM, and to constrain the behavior of the guest software appropriately.

The processor(s) of the physical machine will load and store machine state when a transition into (i.e., entry) or out (i.e., exit) of a VM occurs. Conventional architectures perform a predetermined set of state loading and storing, as defined in processor specifications in a manner similar to other system structures, instruction encodings and machine behaviors. The VMM is coded directly to these specifications. This structuring limits the implementation flexibility of the VMM.

Therefore, there is a need for improved implementations of techniques for entering and exiting VMs. These implementations and techniques should permit better management and control of VM operations.

DESCRIPTION OF THE EMBODIMENTS

Novel methods, apparatus, and systems for managing transitions during VM operation are described. In the following detailed description of the embodiments, reference is made to the accompanying drawings, which form a part hereof, and in which is shown by way of illustration, but not limitation, specific embodiments of the invention that may be practiced. These embodiments are described in sufficient detail to enable one of ordinary skill in the art to understand and implement them, and it is to be understood that other embodiments may be utilized and that structural, logical, and electrical changes may be made without departing from the spirit and scope of the present disclosure. The following detailed description is, therefore, not to be taken in a limiting sense, and the scope of the embodiments of the inventions disclosed herein is defined only by the appended claims.

Figure 1:
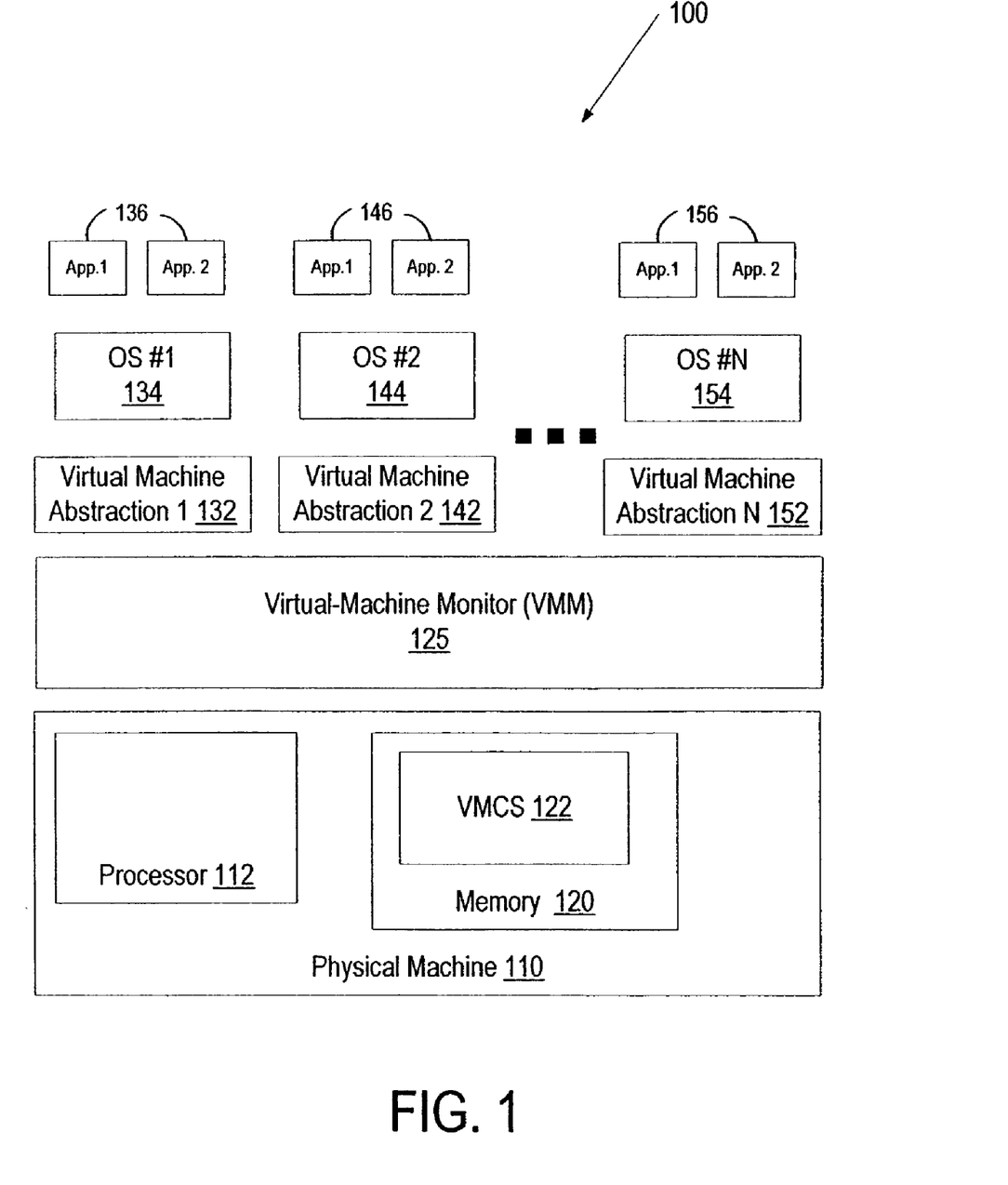
FIG. 1 is a diagram of a VM architecture, in accordance with one embodiment of the invention.

FIG. 1 illustrates one embodiment of a virtual-machine environment 100, in which the present invention may operate. In this embodiment, a physical machine 110 comprises a computing platform, which may be capable, for example, of executing a standard operating system (OS) or a virtual-machine monitor (VMM), such as a VMM 125. The VMM 125, though typically implemented in software, may emulate and export a machine interface to higher-level software. Such higher level software may comprise a standard or real-time OS, may be a highly stripped down operating environment with limited OS functionality, may not include traditional OS facilities, and the like. Alternatively, for example, the VMM 125 may be run within, or on top of, another VMM. The VMM 125 may be implemented, for example, in hardware, software, and firmware, or by a combination of various techniques. VMMs and their typical features and functionality are well known to one of ordinary skill in the art The physical machine 110 can be of a personal computer (PC), mainframe, handheld device, portable computer, set-top box, intelligent appliance, or any other computing system or device. The physical machine 110 includes a processor 112 and memory 120. Additionally, physical machine 110 may include a variety of other input/output devices, not shown.

Processor 112 can be any type of processor capable of executing software, such as a microprocessor, digital signal processor, microcontroller, or the like. The processor 112 may include microcode, macrocode, software, programmable logic or hard coded logic for performing the execution of embodiments for methods of the present invention. Though only one such processor 112 is shown in FIG. 1, it is understood that one or more processors may be present in the system.

Memory 120 can be a hard disk, a floppy disk, random access memory (RAM), read only memory (ROM), flash memory, any other type of machine medium readable by processor 112, or any combination of the above devices. Memory 120 may store instructions and/or data for performing the execution of method embodiments of the present invention.

The VMM 125 presents to other software (i.e., "guest" software) the abstraction of one or more virtual machines (VMs), which may provide the same or different abstractions to the various guests. FIG. 1 shows three VMs, 132, 142 and 152. The guest software running on each VM may include a guest OS such as a guest OS 134, 144 or 154 and various guest software applications 136, 146 and 156. Each of the guest OSs 134, 144 and 154 expects to access physical resources (e.g., processor 112 registers, memory 120 and I/O devices) within the VMs 132, 142 and 152 on which the guest OS 134, 144 or 154 is running and to handle various events including interrupts generated by system devices during the operation of the VMs 132, 142 and 152.

The processor 112 controls the operation of the VMs 132, 142 and 152 in accordance with data stored in VMCS 122. VMCS 122 may be stored in memory 120 (as shown in FIG. 1), within the processor 112, in any other location or in any combination of storage locations. The VMCS 122 provides storage for machine state of the VMM 125 and guest software. Additionally, it may include indicators to limit or otherwise control operation of a VM and to control transitions between a VM and the VMM 125. The VMCS 122 is accessible by the VMM 125. The VMCS need not be a contiguous area of memory or storage. Therefore, in some embodiments, the VMCS can be logically assembled and accessed from a plurality of memory or storage locations.

A transition from the VMM 125 to guest software is called a "VM entry." A transition from guest software to the VMM 120 is called a "VM exit." Collectively, VM entries and VM exits are referred to as "VM transitions." In an embodiment, a VMM 125 may initiate a VM entry by executing a particular instruction to cause the VM entry. In an embodiment, VM exits may be explicitly requested by the VM (e.g., by executing a special instruction to generate the VM exit). In some embodiments, the VM does not directly request a transition, but rather some event (e.g., protection fault, interrupt, and the like) or VM executed instruction requires a VM exit as determined by controls in the VMCS 122 or the architecture of the virtual machine system (e.g., if a particular control bit is set in the VMCS, then executions of the INVLPG instruction cause VM exits; all occurrences of a non-maskable interrupts cause VM exits).

During VM transitions, the processor 112 may act on various elements of machine state. As one of ordinary skill in the art appreciates, machine state can be associated with a variety of architectural components in, for example, the processor(s), I/O devices, chipset, etc. Accordingly, descriptions of various embodiments of the present invention use the phrase "machine state" within its conventional meaning augmented by some components not traditionally viewed as architectural. Thus, machine state can include general purpose and floating-point registers (e.g., in the Instruction Set Architecture (ISA) of Intel's Pentium IV referred to as IA-32 ISA, EAX, EDX, ST3, and the like), control registers (e.g., in the IA-32 ISA, CR0, CR3, and the like), instruction pointers (e.g., in the IA-32 ISA, EIP), processing flags (e.g., in the IA-32 ISA, EFLAGS, and the like), model-specific registers (MSRs) (e.g., in the IA-32 ISA, DEBUGCTL, MTRRs, TSC, and the like), segment registers (e.g. in the IA-32 ISA, CS, SS, TR, and the like which include selector, base, limit, and AR byte fields), additional internal (architectural or non-architectural) machine state (e.g., sleep state, interruptibility information, state-machine state), memory management related state (e.g., PDPTRs, translation look aside buffer (TLB) contents), chipset registers, I/O device state, and others. Correspondingly, the example listing of information presented above is not intended to be exhaustive and can be augmented with other information. Moreover, one of ordinary skill in the art readily recognizes the acronyms presented herein.

The VM system 100 provides a flexible architecture for implementing mechanisms that are used when managing the loading and/or storing of machine state during transitions (e.g., entries and exits) between guest VMs (e.g., 132, 142, and 152) and a host VMM 125.

Figure 2A:
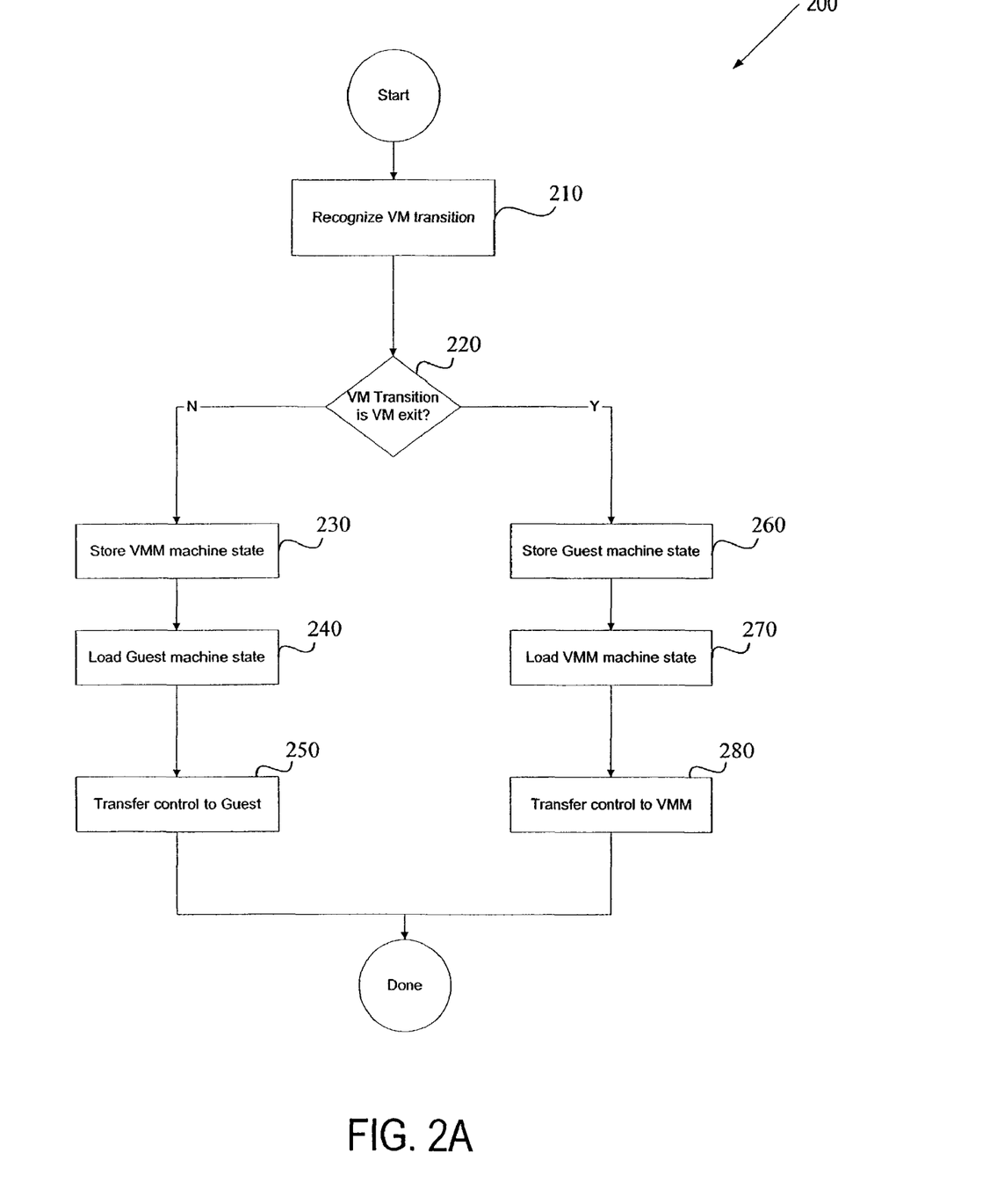
FIG. 2A is a flow diagram of a method to manage a VM transition operation, in accordance with one embodiment of the invention.

FIG. 2A illustrates a flow diagram of one method 200 to manage VM transition operations, in accordance with one embodiment of the invention. The process may be performed by processing logic that may comprise hardware (e.g., circuitry, dedicated logic, programmable logic, microcode, etc.), software (e.g., executing on a general purpose computer system or a dedicated machine), or a combination of both.

At 210, the processor detects that a VM transition is about to take place. The VM transition can be a VM exit or a VM entry. Accordingly, at 220, a check is performed to determine if the VM transition is a VM exit operation.

If the processor is handling a VM entry, then the processor can perform a number of operations in preparation for transferring control from a VMM to a VM. For example, the processor can store VMM machine state, at 230, load VM machine state, at 240, and finally, transfer control to the VM, at 250.

If the processor is handling a VM exit, then the processor can perform a number of operations in preparation for transferring control to a VMM from a VM. For example, the processor can store VM machine state, at 260, load VMM machine state, at 270, and finally transfer control to the VMM, at 280.

Figure 2B:
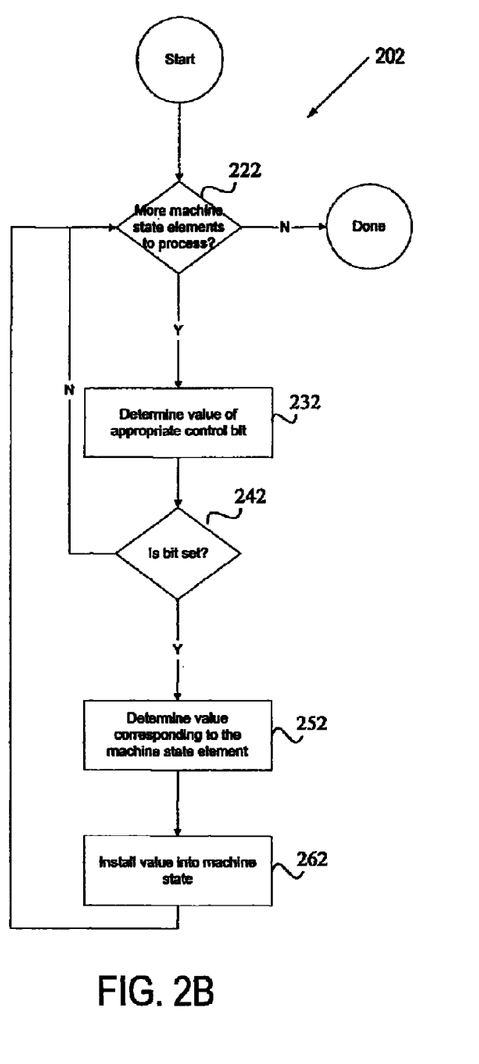
FIG. 2B is a flow diagram of a method to load machine state during a VM transition operation, in accordance with one embodiment of the invention.
Figure 2C:
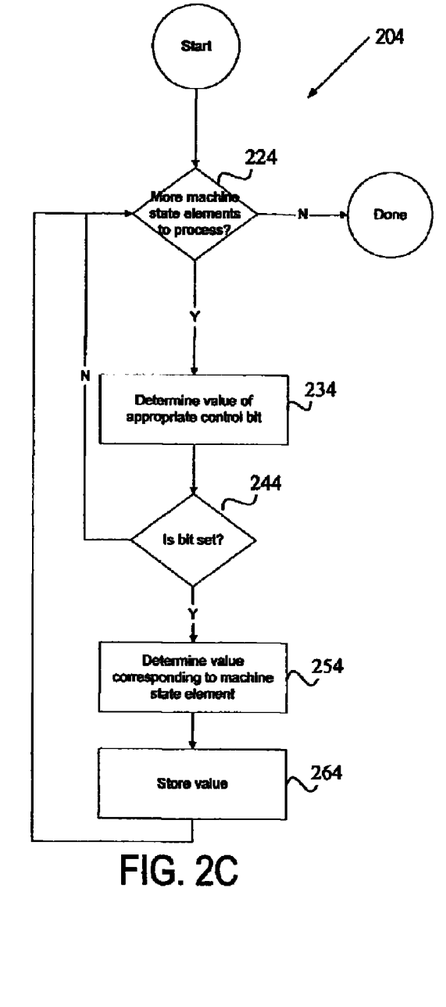
FIG. 2C is a flow diagram of a method to store machine state during a VM transition operation, in accordance with one embodiment of the invention.

Embodiments of methods to load (e.g., at 240 and/or at 270 from FIG. 2) and to store (e.g., at 230 and/or at 260 in FIG. 2) machine state during VM transitions are illustrated in FIG. 2B and FIG. 2C, respectively.

It is understood that other actions may be occurring during VM entry or VM exit processing that are not depicted in FIGS. 2A, 2B and 2C. For example, the validity and consistency of the state being loaded at VM entry or VM exit may need to be assured.

FIG. 2B illustrates a method 202 for loading state during a VM transition. The method may be performed by processing logic that may comprise hardware (e.g., circuitry, dedicated logic, programmable logic, microcode, and the like), software (e.g., executing on a general purpose computer system or a dedicated machine), or a combination of both.

Initially, at 222, it is determined if there remains any elements of machine state that need processing. If no elements of machine state remain to be processed, the method terminates. Otherwise, at 232, a control bit value is determined. These control bits and their determinations are discussed in detail below. If, as determined at 242, the bit is not set (bit has value of 0), control returns to 222. Otherwise (bit is set having a value of 1), at 252, a value for the corresponding element of machine state is determined. The determination of the value is discussed below. This value is then installed in the machine state at 262. Control then returns at 222 to determine if more elements of machine state remain.

FIG. 2C illustrates method 204 for storing machine state during a VM transition. The method may be performed by processing logic that may comprise hardware (e.g., circuitry, dedicated logic, programmable logic, microcode, and the like), software (e.g., executing on a general purpose computer system or a dedicated machine), or a combination of both.

Initially, at 224, it is determined if there remains any elements of machine state that need processing. If no elements of machine state remain to be processed, the method terminates. Otherwise, at 234, a control bit value is determined. These control bits and their determinations are discussed in detail below. If, as determined at 244, the bit is not set (bit has value of 0), control returns to 224. Otherwise (bit is set having a value of 1), a value corresponding to the element of machine state is determined at 254. The determination of the value is discussed below. This value is then stored at 264. Control then returns at 224 to determine if more elements of machine state remain.

In one embodiment, the VMCS includes two sets of control bits that are under the control of the VMM. These control bits are referred to as VM-entry controls and VM-exit controls. The VM-entry controls inform the processor what VMM machine state should be stored and what VM machine state should be loaded during a VM entry. The VM-exit controls inform the processor what VM machine state should be stored and what VMM machine state should be loaded during a VM exit.

By way of example only, the VM-entry controls can be represented as a bit string having a length of 6 where each bit location within the bit string identifies or represents an action or non-action on a particular element of machine state. For example, the bit location within the string and the associated element of machine state can be depicted as follows:

| Bit Location | Processor action and associated element of machine state |
|---|---|
| 0 | store-VMM-DR7 |
| 1 | store-VMM-CR3 |
| 2 | store-VMM-CR4 |
| 3 | load-guest-DR7 |
| 4 | load-guest-CR3 |
| 5 | load-guest-CR4 |

In a similar manner, the VM-exit controls can be represented as a bit string within the VMCS having a length of 4. Likewise, the bit location within the string and the associated action for the element of machine state can be depicted as follows:

| Bit Location | Processor action and associated element of machine state |
|---|---|
| 0 | store-guest-CR3 |
| 1 | store-guest-CR4 |
| 2 | load-VMM-CR3 |
| 3 | load-VMM-CR4 |

At a VM entry, if the VMM has set the "store-VMM-DR7" bit in the VM-entry controls (bit number 0), then the processor will store the current value of the DR7 register. In one embodiment, the value of the DR7 register is stored into the VMCS. Conversely, if the "store-VMM-DR7" bit in the VM-entry controls is cleared, then the processor does not store the DR7 register value. The "store-VMM-CR3" and "store-VMM-CR4" VM-entry control bits (e.g., bit numbers 1 and 2, respectively) behave in a similar fashion.

Likewise, if the VMM has set the "load-guest-DR7" VM-entry control bit (e.g., bit number 4), then the processor will load the DR7 register. In an embodiment, the value loaded is included in the guest VM's DR7 field in the VMCS. If the "load-guest-DR7" VM-entry control bit is cleared, then the processor does not load the DR7 register. Again, the "load-guest-CR3" and "load-guest-CR4" control bits (e.g., bit numbers 4 and 5, respectively) behave in an analogous manner. The VM-exit control bits work in similar ways for controlling the storing of guest VM machinee state and the loading of host VMM machine state at VM exit.

In this example, the VM-entry and VM-exit controls do not control the same elements of machine state; since the VM-entry controls include bits representing DR7 and the VM-exit controls do not. However, as one of ordinary skill in the art readily appreciates, the VM-entry and VM-exit controls can control the same elements of machine state and such representations are intended to fall within the scope of various embodiments for the present invention. Additionally, the particular selection of machine state represented in this example should not be viewed as limiting.

Although the above-presented example provides an illustration for comprehending one embodiment of the present invention, the invention is not intended to be so limited. For example, the value loaded need not be a value in the VMCS and the value stored need not be a value directly from machine state in all scenarios (as it is in the embodiments described above).

In the example given above, the processor can load or store a value for an element of machine state from or to the VMCS. Alternatively, the processor can load or store a fixed value for an element of machine state. Further, the processor can load or store a value that is calculated dynamically. Finally, the processor may take no action regarding an element of machine state (no value is loaded or stored). These alternate mechanisms to determine the value to be loaded or stored are described below.

The processor can load or store a fixed (i.e., constant or predetermined) value for an element of machine state. For example, the processor can load a fixed value into the EFLAGS register at a VM exit. That is, there is no VMM EFLAGS represented in the VMCS. Instead, the processor, prior to transitioning control to the VMM, forces the EFLAGS register in the processor to have a fixed or predetermined value (e.g., 0×2, or other values). In this manner, the processor is "forcing" the value of an element of machine state. In a like fashion, the processor can force a value that is stored to the VMCS at VM entry, force a value that is loaded into machine state at VM entry, and/or force a value that is stored to the VMCS at VM exit.

In this way, not all elements of machine state need to be explicitly represented in the VMCS. This technique provides a flexible mechanism for covering additional elements of machine state, without creating a large or unruly VMCS. Additionally, this forcing of machine state or stored values may improve performance of the implementation of VM exit and VM enter by reducing the number of accesses necessary to the VMCS and by reducing consistency and error checking that is required at VM entry and/or VM exit.

Furthermore, the processor can calculate a value that is then loaded into machine state or stored to the VMCS. This calculated value is dynamically determined based on the value of one or more elements of machine state, values included within the VMCS, and the like. For example, the value loaded into the EIP register at VM exit can be calculated by loading a VMM EIP field value from the VMCS and loading the EIP register with this EIP value augmented by some computed value where the computed value depends on the cause of the VM exit.

Dynamic calculation of an element of machine state may allow for a more efficient implementation of a VMM. For example, in the example given above, the dynamic calculation of EIP at VM exit allows the VMM to construct handlers for individual VM exit sources, eliminating the need to decode the exit reason in VMM software.

Finally, the processor may take no action regarding an element of machine state during a VM transition. For example, the processor may leave the values of the general-purpose registers (e.g., in the IA-32 ISA, EAX, EDX, and the like) unchanged when transitioning from a VM to the VMM.

The processor determines the appropriate action to take regarding an element of machine state during a VM transition by evaluating a "state action indicator." The state action indicator determines which action should be taken. The value of a state action indicator ("state action indicator value") can instruct the processor to load state information from the VMCS or store state information to the VMCS. The state action indicator value can also the processor to force a fixed or predetermined value to be loaded or stored, to take no action with respect to a particular element of machine state being considered, or to load or store a calculated value.

The VM-entry and VM-exit controls discussed above are examples of state action indicators. In this example, the processor uses fields of the VMCS as state action indicators. Each bit in the VM-entry or VM-exit controls corresponds to a single element of machine state. If a bit is set it indicates to the processor that the element of machine state should be loaded/stored from/to the VMCS; if it is cleared, the element of machine state is ignored. In alternate embodiments, a single bit can determine if an element of machine state is to be loaded or forced to a fixed value. In still further embodiments, the state action indicators may be more than a single bit and may encode more complex behavior. For example, the state action indicator may by 2 bits, allowing for 4 values, to distinguish the load, force, calculate and ignore mechanisms described above.

A state action indicator may be associated with a particular VM transition (e.g., with all VM exits), with a particular element of machine state (as in the embodiment of VM-entry and VM-exit controls detailed above) and/or with a plurality of elements of machine state (e.g., a single state action indicator controlling the loading of all general purpose registers in the processor at VM exit).

A state action indicator value can be determined from a value acquired from the VMCS (as in the examples above), can be a fixed (i.e., predetermined) value, or can be a dynamically calculated value. Each of these possibilities are discussed below.

A state action indicator may be stored in the VMCS, under control of the VMM. Examples of state action indicators stored in the VMCS were discussed in detail above.

A state action indicator may be predetermined. If the value of the state action indicator is a fixed or a predetermined value, then the VMM does not have direct control over the actions that the processor takes on corresponding element of machine state at VM transitions. For example, the processor can consistently not store the value of the EIP register during VM enter processing, consistently load a guest value for the EIP register from the VMCS during VM enter processing, and/or consistently load the EIP register during VM exit processing.

A state action indicator may be calculated dynamically. If the state action indicator is a dynamically calculated value, then state action indicator can depend on one or more values associated with one or more elements of machine state, one or more fields in the VMCS, and the like.

For example, in the IA-32 ISA, if the processor will be using physical address extensions (will be in PAE mode) following a VM entry or VM exit, the processor loads the entries for the page directory pointer tables (PDPTRs) from the VMCS. If the processor will not be in a PAE mode, then the PDTRs in the processor are forced to 0. To determine if the processor will be in PAE mode, the processor examines the PAE bit in the CR4 register. Thus, the processor can be said to have made a dynamic determination or calculation of the state action indicator value. If the PAE bit is set, then the state action indicator instructs the processor to "load from the VMCS." If the PAE bit is cleared, then the state action indicator instructs the processor to "force the value" (e.g. force a value of 0). Note that the processing describe herein to determine if the processor will be in PAE mode is simplified to clearly elucidate various embodiments of the present invention. More processing may be required to make this determination, which would be readily recognized and understood by one of ordinary skill in the art.

In another example, the processor can load the base and limit fields for a segment register if the value of a segment's selector is non-zero or if the processor is in V86 mode. To make this determination, the processor examines two pieces of machine state information: the value of the selector for the segment under consideration and the value of a VM bit in an EFLAGS register. If the selector is non-zero or if the VM bit in EFLAGS is set, then the processor is instructed to "load from the VMCS" otherwise, the processor takes no action. Note that the processing described herein to determine if it is necessary to load the base and limit fields is simplified to clearly elucidate various embodiments of the present invention. More processing may be required to make this determination, which would be readily recognized and understood by one of ordinary skill in the art.

As is now apparent to one of ordinary skill in the art, the methods described herein can be used to control the loading and storing of machine state dynamically during transition between a VMM and VMs. Transitions occur into and out of a VMM by using a VMCS and a processor having flexible instruction logic, as presented above by way of example. Moreover, each element of machine state and action taken by the processor need not be affirmative declared or represented solely within the VMCS.

Figure 3:
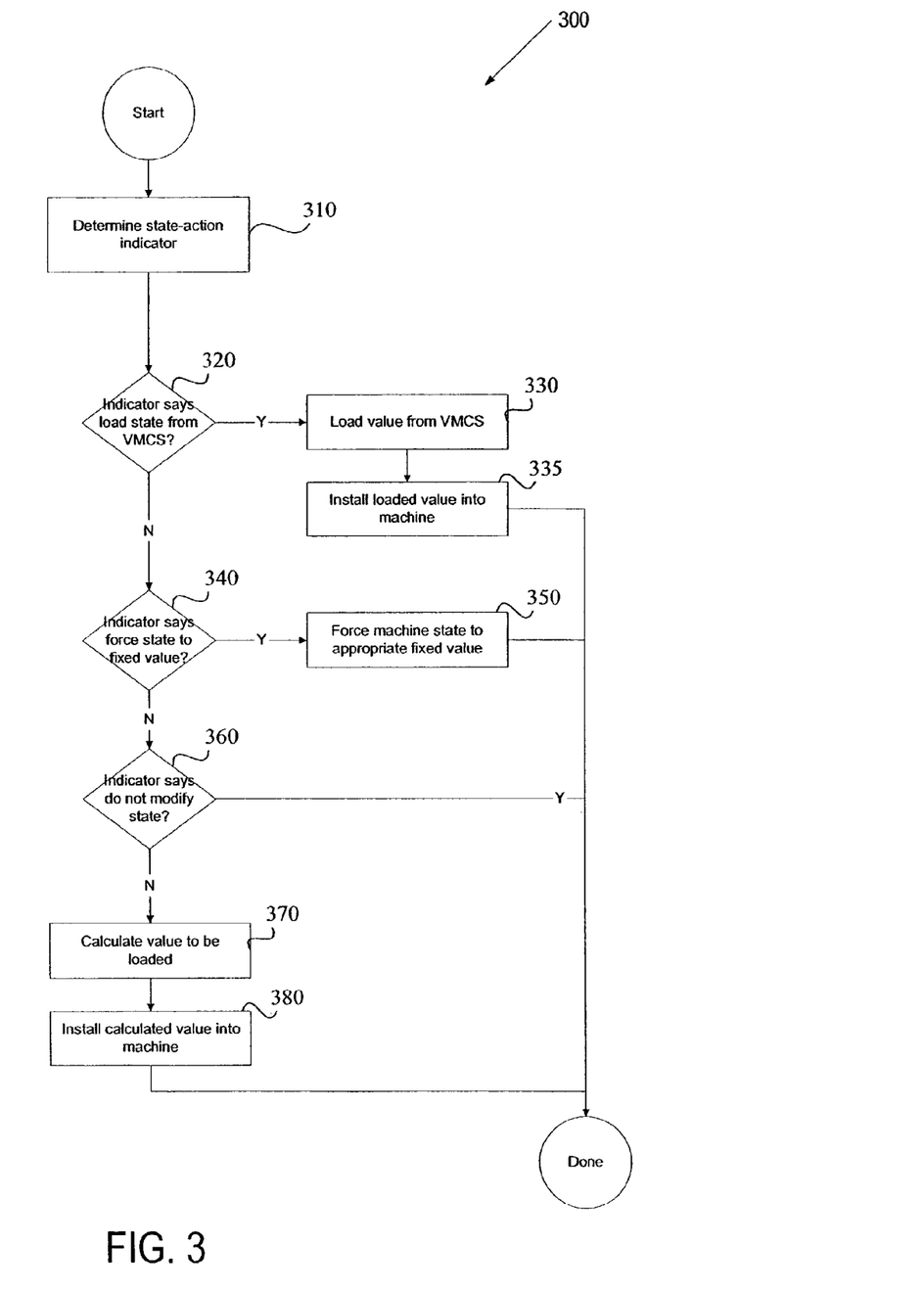
FIG. 3 is a flow diagram of a method for performing load operations during a VM transition, in accordance with one embodiment of the invention.

FIG. 3 illustrates a flow diagram of one method 300 for performing loading of an element of machine state during a VM transition, in accordance with one embodiment of the invention. FIG. 3 can be implemented within the design of a processor for a machine. The method may be performed by processing logic that may comprise hardware (e.g., circuitry, dedicated logic, programmable logic, microcode, and the like), software (e.g., executing on a general purpose computer system or a dedicated machine), or a combination of both.

At 310, the processor determines the state action indicator for the element of machine state under consideration. At 320, the processor examines the state action indicator. If the state action indicator value indicates that the element of machine state under consideration is to be loaded from the VMCS, then, at 330, the value for the element of machine state is loaded and, at 335, installed into the corresponding element of machine state under consideration. However, if the state action indicator value indicates that the element of machine state under consideration is to be forced, as determined at 340, then, at 350, the processor installs the predetermined or forced value into the corresponding element of machine state. Moreover, the state action indicator value can indicate that no action is to be taken by the processor with respect to the element of machine state under consideration, at 360, in which case the processor takes no action (the processor does not modify the element of machine state under consideration).

If the evaluation of the state action indicator at 360 is negative (it does not indicate that no action is required with respect to the element of machine state under consideration), then it can be inferred that a dynamic calculation is required. Of course, in some embodiments, an affirmative check of the state action indicator can be made to determine if a calculation is needed without making any inference of the same. Accordingly, a value for the element of machine state under consideration is calculated at 370 and installed within the element of machine state at 380. The processor can dynamically calculate the value for the element of machine state by examining one or more elements of machine state, examining a value in the VMCS, and/or examining a control indicator value, and so on. Moreover, once examination is done the processor can perform one or more transformations (e.g., calculation) to produce the value for the element of machine state under consideration. Thus, the processor can use a variety of data and performs a variety of actions to generate the value for the element of machine state.

Method 300 would be repeated for each element of machine state, though this is not depicted in FIG. 3. Additionally, as discussed above, each state action indicator may be associated with one or more elements of machine state.

Figure 4:
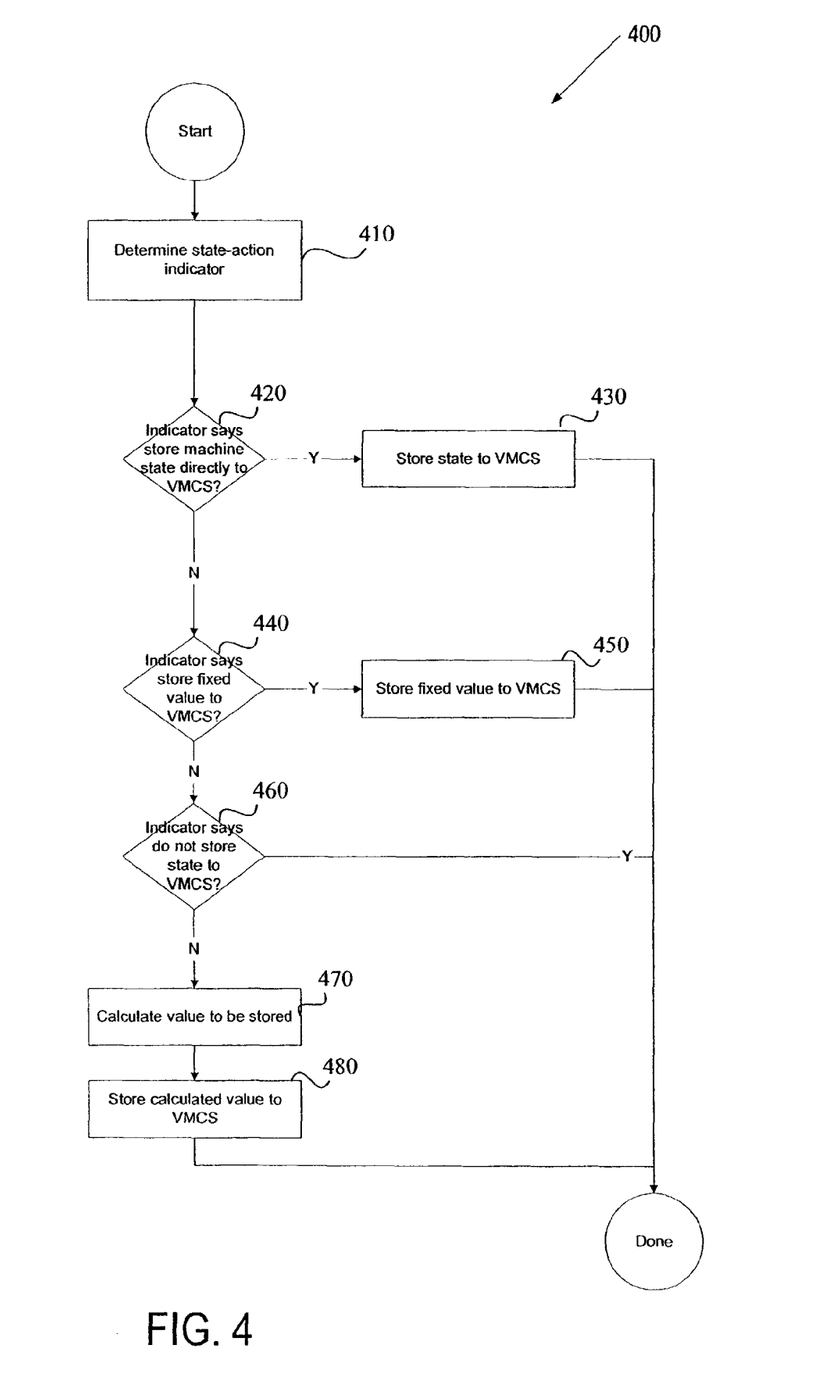
FIG. 4 is a flow diagram of a method for performing store operations during a VM transition, in accordance with one embodiment of the invention.

FIG. 4 illustrates a flow diagram of one method 400 for performing storing of an element of machine state during a VM transition, in accordance with one embodiment of the invention. The method 400 is implemented within processor architectures. The method may be performed by processing logic that may comprise hardware (e.g., circuitry, dedicated logic, programmable logic, microcode, and the like), software (such as run on a general purpose computer system or a dedicated machine), or a combination of both.

At 410, the processor determines the state action indicator for the element of machine state under consideration. At 420 the processor examines the state action indicator. If the state action indicator requires a store of the element of machine state under consideration to the VMCS, then, at 430, the element of machine state under consideration is stored into one or more fields of the VMCS. If this is not the case, then, at 440, the state action indicator value is inspected to determine if a fixed value is to be stored to the VMCS, and if so, at 450, the fixed value is stored into one or more fields of the VMCS. In some circumstances, the state action indicator value can instruct the processor to perform no action as depicted at 460.

At 470, a value corresponding to the element of machine state is dynamically determined. The calculated value is then stored into one or more fields of the VMCS at 480. The processor can dynamically calculate the value by examining one or more elements of machine state, examining a value in the VMCS, and/or examining a control indicator value, etc. Moreover, once examination is done the processor can perform one or more transformations (e.g., calculation) to produce the calculated value that is stored in the one or more fields of the VMCS. Thus, the processor can use a variety of data and performs a variety of actions in order to generate the calculated value.

Method 400 may be repeated for each element of machine state, though this is not depicted in FIG. 4. Additionally, as discussed above, each state action indicator may be associated with one or more elements of machine state.

Figure 5:
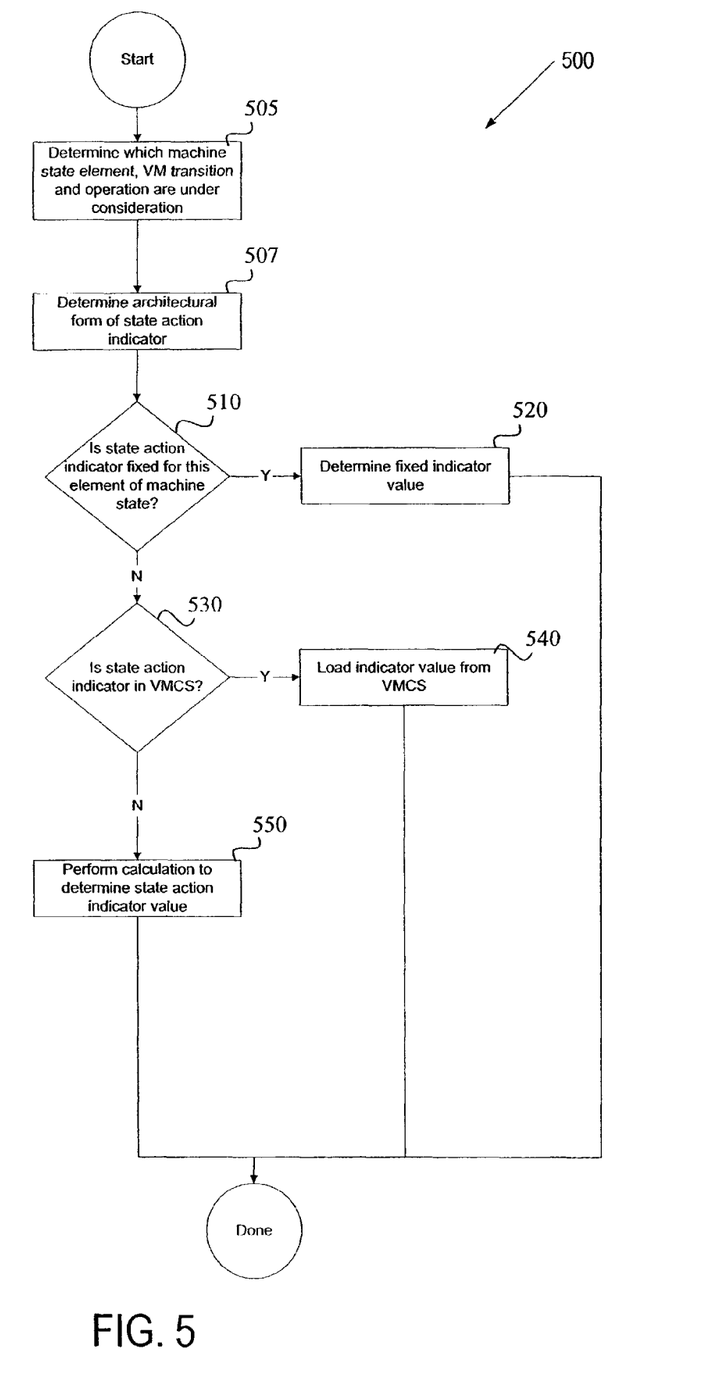
FIG. 5 is a flow diagram of a method for determining a value of a state action indicator during a VM transition operation, in accordance with one embodiment of the invention.

FIG. 5 illustrates a flow diagram of one method 500 for determining a value of a state action indicator during a VM transition operation (e.g., block 310 in FIG. 3 and block 410 in FIG. 4), in accordance with one embodiment of the invention. The method may be performed by processing logic that may comprise hardware (e.g., circuitry, dedicated logic, programmable logic, microcode, and the like), software (such as run on a general purpose computer system or a dedicated machine), or a combination of both.

At 505, the processor determines the element of machine state under consideration, the type of VM transition being processed and whether state loading or storing is being processed. Based on the information determined, at 507, the processor determines if the architecture dictates that the state action indicator associated with this element of machine state is fixed, loaded from the VMCS or calculated.

At 510, if the state action indicator is fixed, then, at 520, the fixed state action indicator value is determined.

At 530, if the state action indicator is to be acquired from the VMCS, then, at 540, the state action indicator value is loaded from the VMCS.

At 550, if the state action indicator is to be dynamically determined or calculated then, at 550 the calculations are performed to determine the state action indicator value. The dynamic determination or calculation can include, for example, loading various fields within the VMCS (including control vector field values), examining various elements of machine state, examining various elements of a VM and/or VMM state, examining one or more control indicator values, and/or transforming (e.g., performing calculations) on the examined information.

In some embodiments, the determination of the state action indicator value and evaluation may not be explicit. The processor may be designed with knowledge that a particular situation calls for a particular action. For example, the logic in a processor may unconditionally force an element of machine state to a particular value without evaluating any state action indicator value explicitly. Hence, the explicit checking described with regard to FIG. 5 should not be viewed as limiting.

The embodiments of the present invention provide improved processing of VM transitions. This is achieved by flexibly embodying processing within the processor that uses a VMCS, but does not need to rely entirely on information provided within the VMCS to perform a VM transition.

One of ordinary skill in the art now appreciates that the implementation of a processor according to various embodiments of the present invention can manage and control the loading and storing of machine state during VM transitions. Specifically, these embodiments provide flexibility to the VMM to dictate the semantics of loading and storing of machine state during VM transitions, as allowed by the architecture. This need not be achieved with a rigid VMCS that accounts for all instances of elements of machine state and not all storing and loading of machine state at VM transitions need be explicitly directed by the VMM through controls in the VMCS.

It is to be understood that the above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method to manage a Virtual Machine (VM) operation, comprising:
   identifying a VM transition to be processed; identifying a plurality of state-action indicators in response to identifying the VM transition, each state-action indicator associated with one of a plurality of elements of a machine state, and each state-action indicator is one of: a data structure describing the associated element of the machine state, and one or more bits in a control vector;
   using the value of each of the plurality of state-action indicators to determine an action on the associated element of the machine state; and
   taking each action during the VM transition.

2. The method of claim 1 wherein in identifying the plurality of state-action indicators, each state-action indicator is also associated with one of a plurality of VM transition types.

3. The method of claim 1 wherein in using, each action includes at least one of: loading the associated element of the machine state, storing the associated element of the machine state, and taking no action.

4. The method of claim 1 wherein in identifying the plurality of state-action indicators, each state action indicator is one of:
   a read value in a Virtual Machine Control Structure (VMCS);
   a fixed value; and
   a calculated value based on at least one of:
      the associated element of the machine state;
      a second element of the machine state;
      an element associated with a state of the VM;
      an element associated with a state of a Virtual Machine Monitor (VMM);
      a control indicator value; and
      a field value in the VMCS.

5. The method of claim 1 wherein in using, each action performs one of:
   storing the associated element of the machine state to field in a Virtual Machine Control Structure (VMCS);
   storing a fixed value to the field in the VMCS; and
   storing a calculated value to the field in the VMCS.

6. The method of claim 5 wherein in storing the calculated value, the calculated is determined by:
   examining one or more values of at least one of:
      an element of the machine state;
      a value in the virtual machine control structure (VMCS); and
      a control indicator; and
   transforming the one or more examined values to form the calculated value.

7. The method of claim 1 wherein in using, each action performs one of:
   loading the associated element of the machine state a field in a Virtual Machine Control Structure (VMCS);
   loading a calculated machine state value into the associated element of the machine state; and
   loading a fixed value into the associated element of the machine state.

8. The method of claim 7 wherein in loading the calculated machine state value, the calculated machine state value is determined by:
   examining one or more values of at least one of:
      an element of the machine state;
      a value in the Virtual Machine Control Structure (VMCS); and
      a control indicator; and
   transforming the one or more examined values to form the calculated machine state values.

9. The method of claim 1 wherein in identifying the VM transition, the VM transition is at least one of a VM entry and a VM exit.

10. A system for managing a Virtual Machine (VM), comprising:
    a memory; and
    a processor to identify a VM transition to be processed, to determine, based on a plurality of state action indicators, each state-action indicator associated with one of a plurality of elements of machine state, to store in the memory and/or load from the memory each associated element of the processor's state, and to store in the memory and/or load from the memory each associated element before the VM transition is completed, wherein the processor accesses a Virtual Machine Control Structure (VMCS) that includes two sets of control bits, the first set of control bits are used by the processor to identify elements of the processor's state to store and elements of the processor's state to load on an entry to a virtual machine (VM), the second set of control bits are used by the processor to identify elements of the processor's state to store and elements of the processor's state to load on an exit from the VM.

11. The system of claim 10, wherein the processor determines the value of each state-action indicator by one of:
    acquiring a field value from a Virtual Machine Control Structure (VMCS);
    determining a fixed value; and
    calculating a calculated value.

12. The system of claim 10 wherein in storing each associated element of the processor's state further comprises:
    storing each associated element of the processor's state to an associated field in a Virtual Machine Control Structure (VMCS);

storing a fixed value to the associated field in the VMCS; and storing a calculated value to the associated field in the VMCS.

13. The system of claim 12 wherein in storing each calculated value, each calculated value is determined by:
examining one or more values of at least one of:
an element of the processor's state;
a value in the VMCS; and
a control indicator; and
transforming the examined one or more values to form the calculated value.

14. The system of claim 10 wherein in loading each associated element of the processor's state further comprises:
loading an associated element of the processor's state from an associated field in a Virtual Machine Control Structure (VMCS) into the associated element of the processor's state;
loading a calculated value into the associated element of the processor's state; and
loading a fixed value into the associated element of the processor's state.

15. The system of claim 14 wherein in loading the each calculated value, each calculated value is determined by:
examining one or more values of at least one of:
an element of the processor's state;
a value in the VMCS; and
a control indicator value; and
transforming the one or more examined values to form the calculated value.

16. A storage medium containing instructions for:
detecting a need for a Virtual Machine (VM) transition;
resolving a plurality of state-action indicators and their corresponding state-action indicator values in response to detecting the need for a VM transition, each state-action indicator associated with one of a plurality of elements of a machine state, and each state action indicator is resolved by Performing one of:
reading an indicator value from a Virtual Machine Control Structure (VMCS);
determining a fixed value; and
calculating a calculated value; and
executing an action on each associated element of a the machine state based on resolved state-action indicator values.

17. The medium of claim 16 wherein in detecting, the VM transition is at least one of a VM exit from a Virtual Machine Monitor (VMM) and a VM entry into a VM.

18. The medium of claim 16 wherein in calculating, the calculated value is determined by performing at least one of:
using the associated element of the machine state;
using a second element of the machine state;
using an element associated with a state of the VM;
using an element associated with a state of the VMM;
using a control indicator value; and
using a field value in the VMCS.

19. The medium of claim 16 wherein in executing, each action is executed by performing at least one of:
storing associated element of machine state;
storing a fixed store value;
storing a calculated store value;
loading a value from an associated field in a Virtual Machine Control Structure (VMCS) into the associated element of machine state;
loading a fixed load value into the associated element of machine state; and
loading a calculated load value into the associated element of machine state.

20. The medium of claim 16 further comprising completing the VM transition after all of the actions are executed.

* * * * *